Patented Dec. 10, 1929

1,738,625

UNITED STATES PATENT OFFICE

RUDOLF WIETZEL AND LEO SCHLECHT, OF LUDWIGSHAFEN-ON-THE-RHINE, AND OTTO KÖHLER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

CONCENTRATION AND DISTILLATION OF SOLUTIONS OF HYDROGEN PEROXIDE

No Drawing. Application filed January 18, 1927, Serial No. 161,956, and in Germany January 18, 1926.

The production of highly concentrated solutions of hydrogen peroxide has hitherto been usually effected by means of the distillation in vacuo, of the dilute solutions obtained by one of the ordinary methods. When working in this manner, however, the catalytic influence of impurities or the walls of the vessel employed for the distillation readily lead to decomposition of the hydrogen peroxide, and this has frequently resulted in serious interruptions of the work, and even in explosions. It has been proposed in order to obviate these objections to concentrate the dilute solutions at ordinary pressure by fractional distillation effected by passing a strong current of gas through the solutions at temperatures below 85° C. If, however, the last named process is applied to large quantities, a considerable proportion of the hydrogen peroxide also undergoes decomposition, especially towards the end of the distillation. Moreover, it is impossible, to obtain concentrated hydrogen peroxide in a continuous manner as is desirable when working on a large scale, by introducing the dilute solution continuously.

We have now found that a much improved yield and a continuous production of highly concentrated hydrogen peroxide may be obtained by allowing the dilute solution containing the hydrogen peroxide to flow in a finely divided state or in the form of a thin film or layer over substances presenting a large superficial area, or by atomizing it in chambers, and simultaneously treating it with the assistance of heat if necessary, with gases or vapors, preferably on the counterflow principle, so as to obtain intimate contact between the solution and drying medium. According to this method of working it is possible to vaporize the bulk of the water without carrying away any appreciable quantity of the hydrogen peroxide, and as the solution is thus exposed to the action of the gases and heat for only a short time, the hydrogen peroxide undergoes practically no decomposition.

The procedure to be adopted according to this invention may consist, for example, in allowing the dilute solution to trickle, in a finely divided state, down in or flow along the walls of vertically or obliquely disposed pipes which are heated to 70° C. from outside, whilst a current of preheated air, which has been dried for example by cooling or by the aid of adsorbents, ascends from below so as to meet the solution. The moisture laden air issues from an upper lateral outlet from the pipes, and the concentrated solution of peroxide drains away continuously from the lower end, whereupon it is preferably cooled immediately.

The process according to the present invention may be carried out in a still simpler manner in towers, heated externally or internally, for example by heating coils, containing superimposed domes, or suitable non-catalytic fillers, such as balls of glass or porcelain. In this manner, a 3 per cent solution, for example, may be raised to a concentration of 50 per cent by the aid of a current of preheated dry air at a temperature of 65° C. in the proportion of 6 cubic metres of air per litre of dilute solution. The desired concentration of the resulting concentrated solution may be controlled by modifying the temperature and the air supply. The external or internal heating of the columns may be partially or entirely dispensed with, provided the air or other drying medium to be used is preheated, a preferable way of effecting this being to utilize for this purpose the heat carried away in the current of moisture-laden exhaust gas.

For the expulsion of the water, air may be replaced by any gases or vapors incapable of reacting with the hydrogen peroxide solution and only to a small degree soluble therein. It is preferable, however, to employ air, oxygen or other gases containing oxygen. The exhaust gases may be returned to the circulation after their moisture content has been removed. It is frequently advisable to free the gases, prior to use, from dust and other impurities which would cause decomposition of the hydrogen peroxide.

The present method can also be used with advantage for obtaining pure hydrogen peroxide solutions by the separation from inorganic constituents such as salts and the like by way of distillation. As the vapor tension of hydrogen peroxide becomes the higher the greater the concentration of the solution, the vapors of the liquid when applying the above mentioned treatment will at length contain a considerable amount of hydrogen peroxide vapor, and by condensation of the mixture pure hydrogen peroxide solution is obtained. When starting from a dilute impure hydrogen peroxide solution the concentration of hydrogen peroxide in the distillate would be too low, and in such cases it is preferable to first concentrate the solution in the afore-described manner immediately before distillation. For this purpose for example two trickling towers may be arranged either side by side or one on top of the other, the first of which serving for concentrating the hydrogen peroxide solution by treating with a current of gas at a proper speed and temperature, whereupon in the second tower the concentrated hydrogen peroxide solution is distilled in a similar way but with a properly altered speed and temperature. Or still simpler, a single trickling tower is employed in the top of which the dilute impure solution is introduced while at the same time a strong current of hot air is introduced from below from which current a portion is branched off and carried away from the column at a spot where the hydrogen peroxide solution has been enriched to say 70 per cent when a condensate of about 20 per cent concentration of pure hydrogen peroxide is obtained. The remainder of the current of air is passed further through the upper part of the column which it leaves at the top, and there practically only water vapor condenses in correspondence with the vapor tension of the counter-flowing dilute solution. In the lower part of the column impurities are collected which being in the most cases salts, can give rise to clogging, and for avoiding this nuisance the lower part is not provided with filling bodies, but a suitable device for example a worm conveyor may be arranged therein in order to withdraw the solid residues continuously.

The said process may also be modified by drawing off the water vapor by means of diminished pressure obtained by sucking off the wet gases and vapors more quickly than introducing, and passing through a current of gas. In this case, also, the operation may be rendered continuous by arranging the distilling plant so that the length of the outlet pipe for the concentrated hydrogen peroxide solution corresponds to the barometric difference between the vacuum in the evaporation column and the external atmospheric pressure.

The employment of diminished pressure may also be combined with the above described treatment with gases or vapors. Or the treatment with gases or vapors may even be carried out under elevated pressure.

We claim:

1. The process of producing concentrated solutions of hydrogen peroxide which consists in bringing a finely divided hydrogen peroxide solution into intimate contact with a gaseous drying medium.

2. The process of producing concentrated solutions of hydrogen peroxide which consists in bringing a finely divided hydrogen peroxide solution at an elevated temperature into intimate contact with a gaseous drying medium.

3. The process of producing concentrated solutions of hydrogen peroxide which consists in bringing a finely divided hydrogen peroxide solution at an elevated temperature and under a lower pressure than atmospheric pressure into intimate contact with a gaseous drying medium.

In testimony whereof we have hereunto set our hands.

RUDOLF WIETZEL.
LEO SCHLECHT.
OTTO KÖHLER.